(12) United States Patent
Nakagawa et al.

(10) Patent No.: US 6,807,354 B2
(45) Date of Patent: Oct. 19, 2004

(54) WAVEGUIDE OPTICAL DEVICE

(75) Inventors: Goji Nakagawa, Kawasaki (JP);
Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 10 days.

(21) Appl. No.: 10/293,927

(22) Filed: Nov. 14, 2002

(65) Prior Publication Data

US 2003/0123831 A1 Jul. 3, 2003

(30) Foreign Application Priority Data

Nov. 14, 2001 (JP) .................................. 2001-348741

(51) Int. Cl.[7] .............................................. G02B 6/10
(52) U.S. Cl. .................................................. 385/132
(58) Field of Search ......................................... 385/132

(56) References Cited

U.S. PATENT DOCUMENTS

| | | | | |
|---|---|---|---|---|
| 6,304,706 B1 | * | 10/2001 | Sugita et al. | 385/129 |
| 6,393,185 B1 | * | 5/2002 | Deacon | 385/50 |
| 6,519,380 B2 | * | 2/2003 | Dawes et al. | 385/14 |
| 6,574,409 B1 | * | 6/2003 | Moroni et al. | 385/129 |
| 2002/0191935 A1 | * | 12/2002 | Gao | 385/132 |

* cited by examiner

Primary Examiner—Mark Tremblay
(74) Attorney, Agent, or Firm—Staas & Halsey LLP

(57) ABSTRACT

A channel core pattern includes a plurality of core pattern elements having different lengths, another core pattern connected with the channel core pattern in series, and a refractive index of the channel core pattern is higher than a refractive index of the another core pattern.

20 Claims, 11 Drawing Sheets

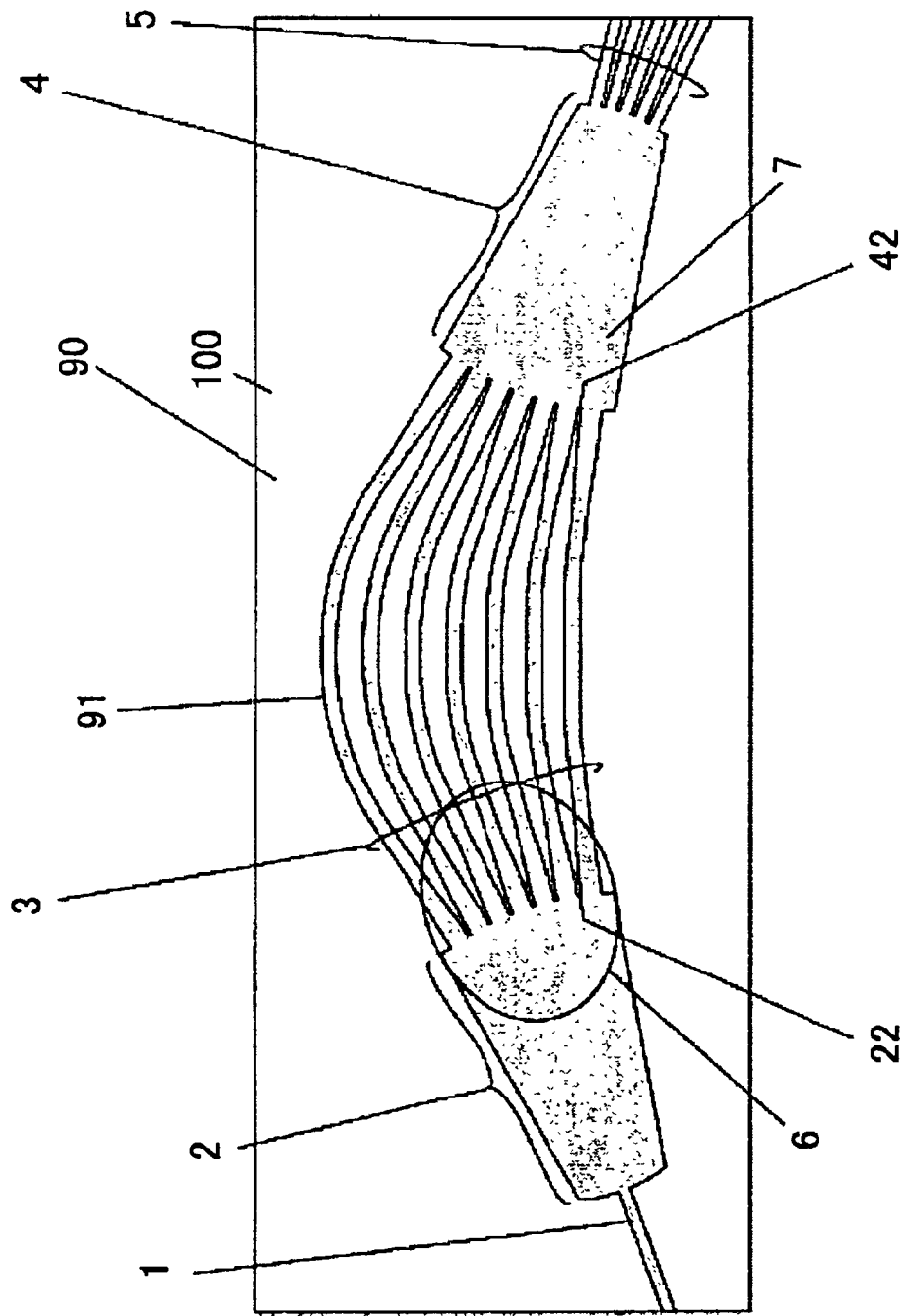

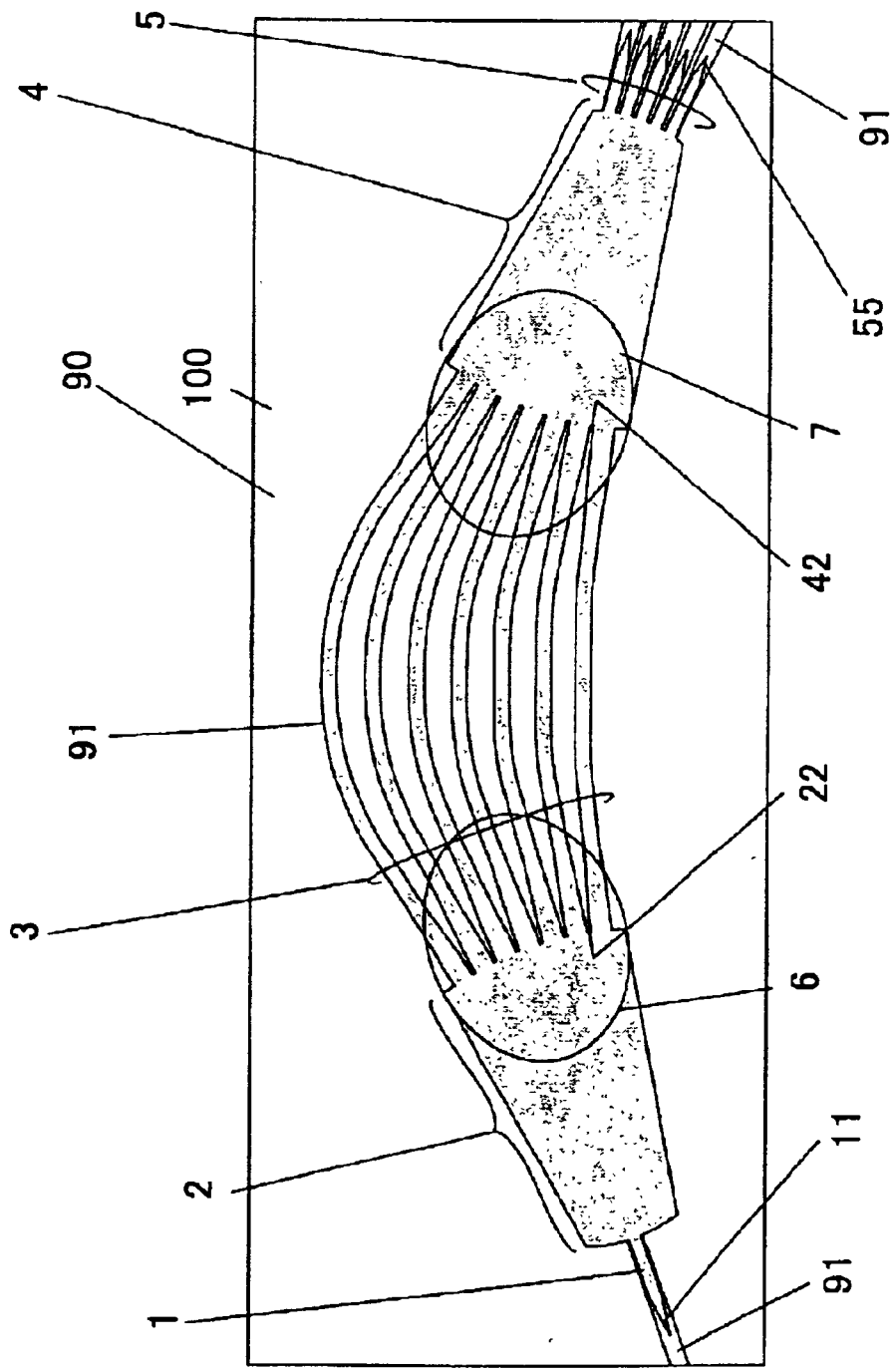

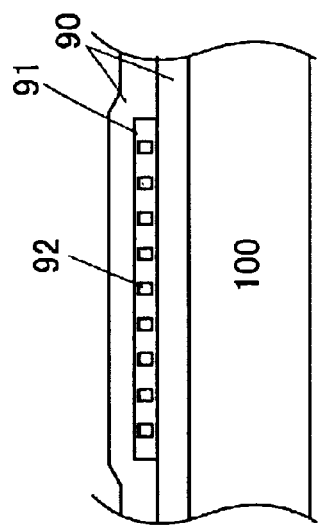
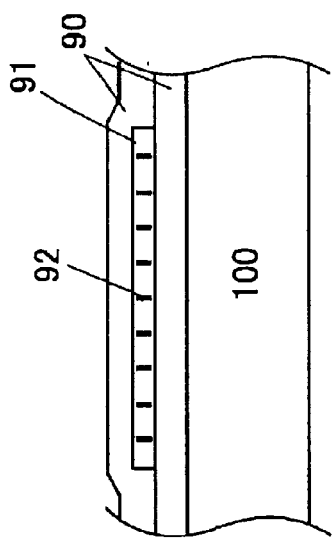
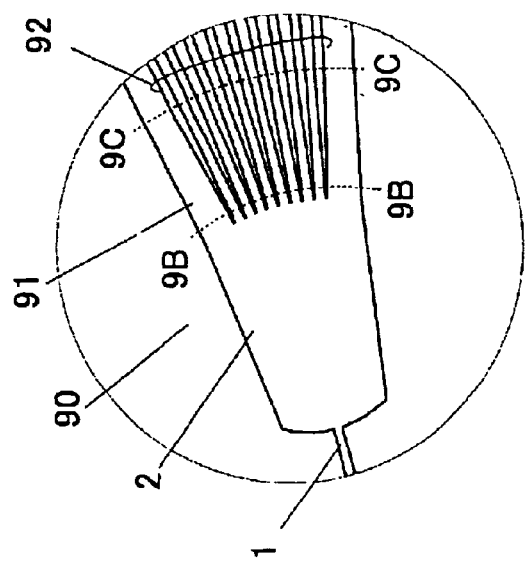

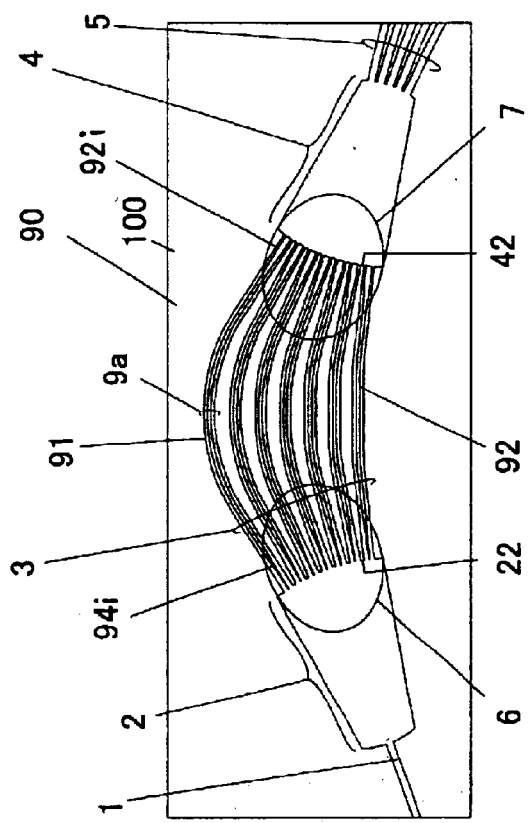
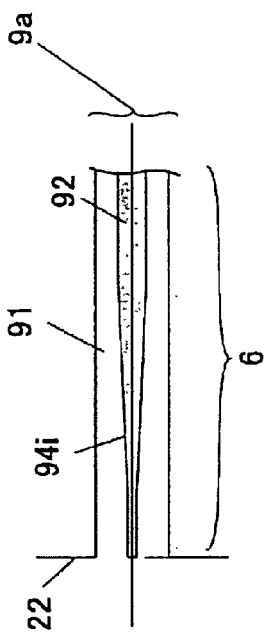
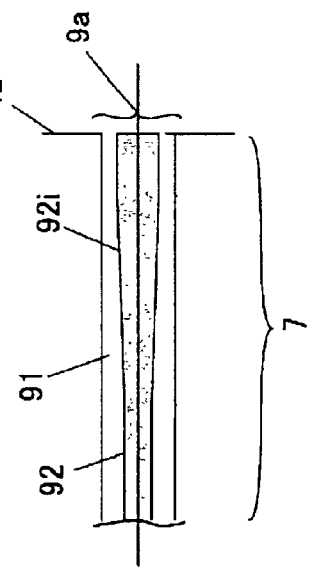

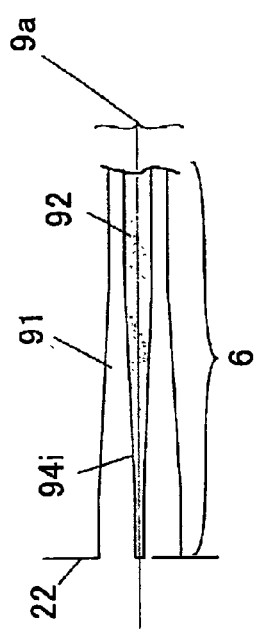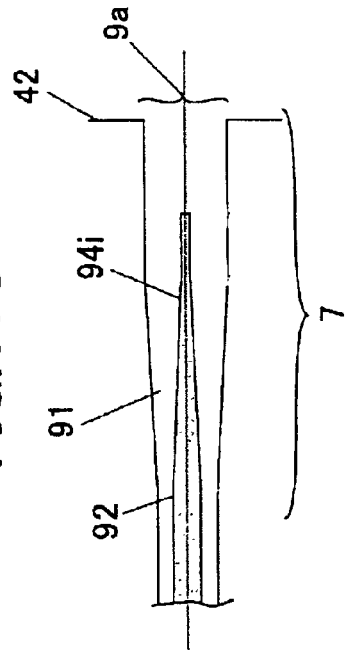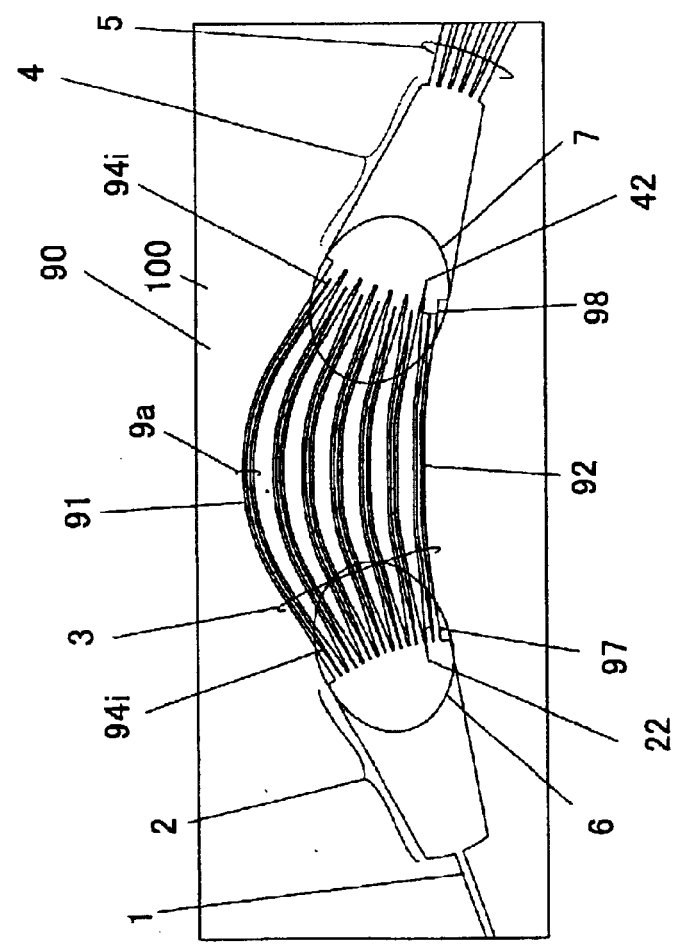

WAVEGUIDE OPTICAL DEVICE

BACKGROUND OF THE INVENTION

1. Field of the Invention

The present invention relates to a waveguide optical device, and, in particular, to an array waveguide wavelength mixing/branching device which mixes light with different wavelengths (mixing) and/or decomposes multiplexed light for respective wavelengths (branching).

2. Description of the Related Art

In order to achieve efficient and positive signal transmission, in a technical field such as a wavelength multiplex optical telecommunications field or an optical signal processing field, an improvement in performance of waveguide integrated optical device, in particular, waveguide optical devices such as array waveguide wavelength mixing/branching device is demanded.

In a wavelength multiplexing optical telecommunications in which simultaneously a plurality of optical signals having different wavelengths are transmitted, a wavelength mixing/branching device which mixes or braches optical signals having different wavelengths is an important device. Especially, a wavelength mixing/branching device (referred to as an array waveguide wavelength mixing/branching device, hereinafter) using an array waveguide diffraction grating which includes an optical waveguide elements formed on a plane substrate attracts attention as a practical device in the above-mentioned telecommunications system.

FIG. 1 shows a plan view of such an array waveguide wavelength mixing/branching device in the related art. As shown in the figure, this mixing/branching device has a configuration including an input waveguide 1, an input slab waveguide 2, a channel waveguide 3, an output slab waveguide 4, and an output waveguide 5 connected in sequence formed on a substrate 100.

After the optical path of an optical signal incident into the input waveguide 1 from the outside via an optical fiber is expanded through diffraction in the input slab waveguide 2, the optical signal is incident into the plurality of waveguide elements of the channel waveguide 3. This incident optical signal arrives at the output slab waveguide 4 after propagating through the channel waveguide 3. At this time, the optical signal radiating from the plurality of waveguide elements 3 as a form of a plurality of light elements interferes with each other of the respective light elements, condenses near the connection point between the output slab waveguide 4 and the output waveguide 5, then is incident into respective waveguide elements of the output waveguide 5. After that, these light elements of the optical signal are led to the substrate end.

Due to phase difference occurring due to the difference in optical propagation distance between the plurality of waveguide elements of the channel waveguide 3, the positions at which the respective light elements of the optical signal condense differ from each other according to the wavelengths thereof. Thanks to this effect, the light elements of the optical signal having different wavelengths are obtained from the respective waveguide elements of the output waveguide 5. Thus, the wavelength-multiplexed optical signal is demultiplexed into the optical signals having the respective wavelengths. According to the same principle, this type of AWG can also be used for combining/multiplexing the plurality optical signals having different wavelengths into the wavelength-multiplexed optical signal.

The above-described array waveguide wavelength mixing/branching device may be produced as the waveguide elements are together formed on the plane substrate through a photolithography technique. Then, as described above, the diffraction grating thus produced is utilized to provide a function same as a spectrometer. Thus, the array waveguide wavelength mixing/branching device is an effectively miniaturized optical device, can be produced in a mass-production manner and, as a result, especially attracts attention as a suitable wavelength mixing/branching device for the field of wavelength multiplexing telecommunications. Such array waveguide wavelength mixing/branching device may be simply referred to as an AWG (Arrayed Waveguide Grating), hereinafter.

Such an AWG includes the slab waveguide and the channel waveguide as mentioned above. There, as shown in FIG. 1, cores 91 having an medium refractive index are formed in a base 90 having a low refractive index, such a configuration is called 'medium-refractive-index type AWG', and will now be referred to as a first related art. According to the first related art, the chip size may become larger, and, thus, miniaturization and cost reduction may not be achieved sufficiently, as the bending radius of the channel waveguide 3 cannot be made shaper efficiently because the refractive index thereof is not so high.

In order to realize the miniaturization of the chip, the channel waveguide needs to be bent much and thus, it is necessary to make the bending radius smaller. For this purpose, as shown in FIG. 2, cores 91 of a high refractive index is formed in a base 90 of a low refractive index. Namely, the ratio $\Delta n$ in refractive index between the low refractive index part (base) and the high refractive index part (cores) is made larger. Such a configuration (high-refractive-index type AWG) will now be referred to as a second related art. Specifically, this ratio $\Delta n$ is made as high as 1.5% as a high specific refractive index. Thereby, the bending radius of the channel waveguide can be reduced into 2 mm. In contrast thereto, in a case (for example, the case shown in FIG. 1) where this ratio $\Delta n$ is 0.5% (low specific refractive index) the bending radius is 20 mm. Accordingly, it is possible to remarkably reduce the size of the chip by employing the manner described above with reference to FIG. 2.

However, when enlarging this ratio $\Delta n$, the core size should also be reduced at the same time in order to fulfill a so-called single mode waveguide requirement of signal light. Thereby, a problem occurs in that optical coupling loss becomes larger at a connection with a single mode optical fiber. Specifically, in the case of $\Delta n$ being 1.5%, the coupling loss becomes 2.1 dB which is remarkably higher than 0.1 dB in the case where $\Delta n$ is 0.5%.

For solution of this problem, as shown in FIGS. 3 and 4, a mode-transformation part 11 is provided in a form of taper shape or the like. Then, therethrough, in a midway of the input waveguide 1, a part (medium-refractive-index core 91) directly connected with an optical fiber having a refractive index of 0.5% is connected with a part directly connected with the input slab 2 having a refractive index of 1.5%. Similarly, through a mode transformation part 55, in a midway of the output waveguide 5, a part (medium-refractive-index cores directly connected with an optical fiber having a refractive index of 0.5% is connected with a part directly connected with the output slab 4 having a refractive index of 1.5%. Thereby, it becomes possible to achieve reduced loss coupling with the optical fibers, and at the same time, to achieve the miniaturization of AWG. Such a technology (double-core high-refractive-index type AWG) will be refereed to as a third related art, hereinafter.

However, in the AWG according to the third related art described above with reference to FIGS. 3 and 4, mode transformation loss occurs in the mode transformation parts 11 and 55. Thereby, sufficient loss reduction of AWG cannot be achieved. Moreover, in the manufacturing process of waveguides on the AWG, high precision is required for photomask alignment in the mode transformation part between the pattern of Δn=0.5% and the pattern of Δn=1.5%. Then, if the photomask alignment accuracy is degraded into the order of 0.1 micrometers, extra loss occurring in the mode transformation part becomes more than 1 dB. This matter also causes difficulty in loss reduction of AWG.

SUMMARY OF THE INVENTION

An object of the present invention is to provide a waveguide optical device in which such a mode transformation loss as that occurring in the third related art can be eliminated so as to effectively reduce the optical propagation loss, and also, manufacture thereof is easier.

According to the present invention, a channel core pattern includes a plurality of core pattern elements having different lengths (channel waveguide 3), and a refractive index of the channel core pattern there is higher than a refractive index of another core pattern (to be connected to an external optical fiber). As the core pattern elements of the channel core pattern has the relatively high refractive index, sharp bending of the channel core pattern can be allowed. Also, as the another core pattern having the relatively low refractive index is used for connecting with the external optical fiber, the degree of mode transformation to be made in the connection with the optical fiber can be effectively reduced, and thus, the mode transformation loss can be reduced.

Furthermore, according to the present invention, connection between the channel core having the relatively high refractive index and the fiber connecting core having the relatively low refractive index can be made in a zone at which the core width thereof is wider.

Accordingly, it is possible to achieve miniaturize and cost reduction of the waveguide optical device, and, also, to effectively reduce the optical propagation loss.

Furthermore, as the connection between the core part having the relatively high refractive index and the core part having the relatively low refractive index is made at the zone at which the core width thereof is wider, it is possible to remarkably ease the management of photomask alignment error at the time of manufacture, and, as a result, to reduce the manufacture cost.

Other objects and further features of the present invention will become more apparent from the following detailed description when read in conjunction with the accompanying drawings.

BRIEF DESCRIPTION OF THE DRAWINGS

FIG. 2 shows a plan view of general configuration of a high-refractive-index type AWG in the related art (second related art);

FIG. 3 shows a plan view of general configuration of a double-core type and high-refractive-index type AWG in the related art (third related art);

FIG. 9A shows a partial magnified view of the plan view shown in FIG. 6B in particular at a portion at which an input slab waveguide and a channel waveguide are connected with one another, FIG. 9B shows a cross-sectional view thereof taken along a line 9B—9B, and FIG. 9C shows a cross-sectional view of the same but taken along a line 9C—9C;

FIG. 10A shows a plan view of an AWG according to a fourth embodiment of the present invention, FIG. 10B shows a partial magnified view thereof in particular for each waveguide element at a portion at which an input slab waveguide is connected with a channel waveguide, and FIG. 10C shows a partial magnified view of the same in particular for each waveguide element but at a portion at which an output slab waveguide is connected with the channel waveguide; and FIG. 11A shows a plan view of an AWG according to a variant embodiment of the above-mentioned fourth embodiment of the present invention, FIG. 11B shows a partial magnified view thereof in particular for each waveguide element at a portion at which an input slab waveguide is connected with a channel waveguide, and FIG. 11C shows a partial magnified view of the same in particular for each waveguide element but at a portion at which an output slab waveguide is connected with the channel waveguide.

DETAILED DESCRIPTION OF THE PREFERRED EMBODIMENTS

Figure 5A:
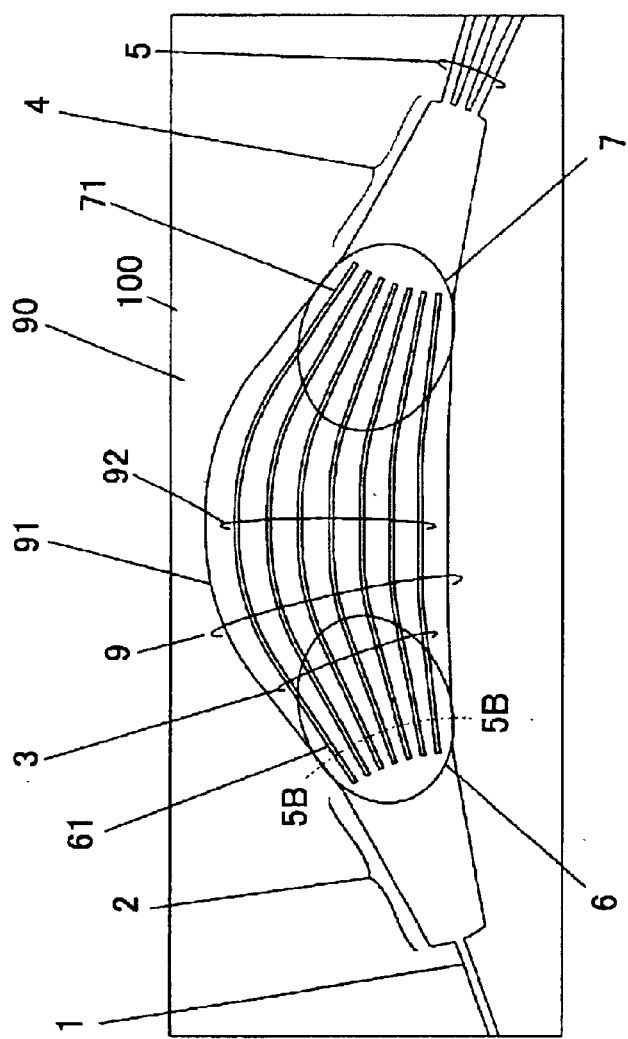
FIG. 5A shows a plan view of an AWG according to a first embodiment of the present invention.
Figure 5B:
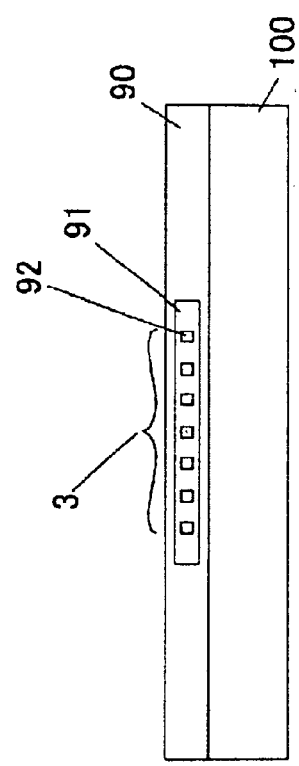
FIG. 5B shows a cross-sectional view thereof taken along a line 5B—5B.

With reference FIGS. 5A and 5B, a basic concept of the present invention will now be descried first. FIG. 5A shows a plan view of an AWG according to a first embodiment of the present invention, while FIG. 5B shows a cross-sectional view thereof taken along a line 5B—5B. According to the present invention, as shown in the figures, for example, a material 90 of a low refractive index is used as a base 90 formed on a substrate 100, a material of a high refractive index is used as core parts (waveguide elements) 92 of a channel waveguide 3, while a material of an medium refractive index is used as the other part, i.e., a core part 91 of an input waveguide 1, an input slab waveguide 2, an output slab waveguide 4, and an output waveguide 5. As shown in FIG. 5B, in the channel waveguide 3, the medium-refractive-index core part (outer core) 91 is provided in the low-refractive-index base 90, and, further, the high-refractive-index core parts (inner core) 92 are provided in the medium-refractive-index core part 91.

Figure 6A:
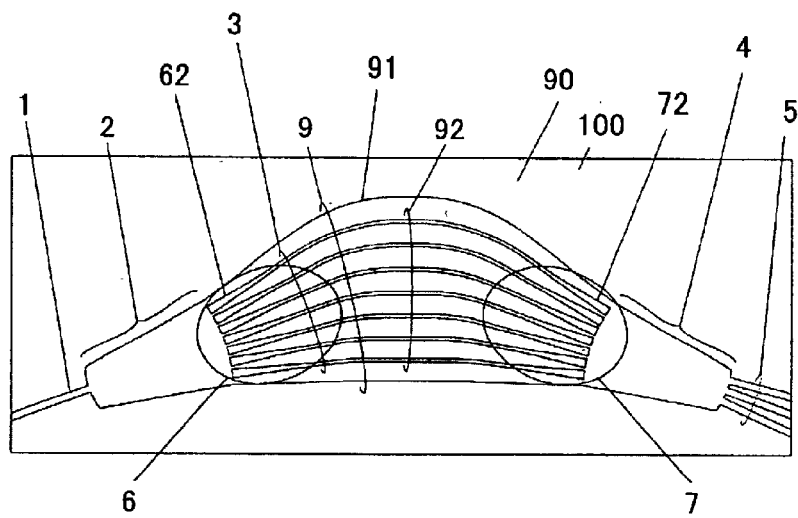
FIGS. 6A and 6B show respectively variant embodiments of the first embodiment of the present invention shown in FIGS. 5A and 5B.
Figure 6B:
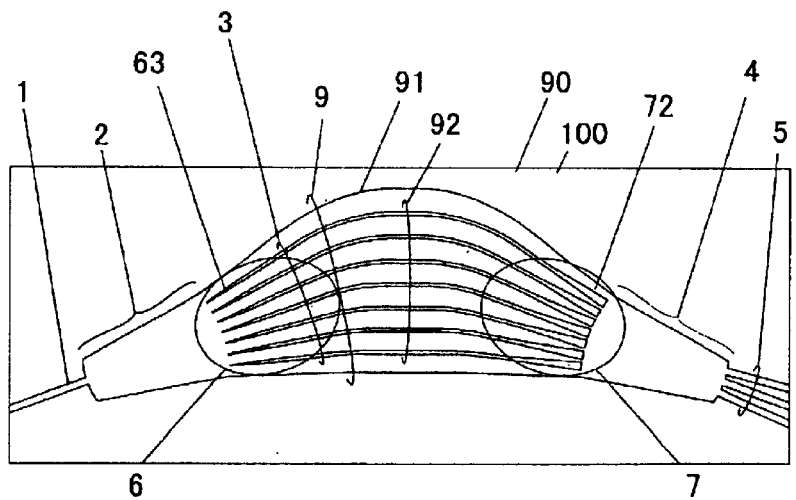

FIGS. 6A and 6B show variant embodiments of the first embodiment described above with reference to FIGS. 5A and 5B. As shown in the figures, it is preferable that taper parts 62/63 and 72 are provided at portions optically connecting the channel waveguide 3 with the slab waveguides 2 and 4. In the taper parts, the core width gradually increases or decreases toward the slab waveguide 2 or 4 in a manner of taper. By applying such a taper structure having the width thereof gradually increasing or decreasing (same effect can be obtained in either way), it is possible to expand the optical mode field (intensity distribution) with a reduced optical propagation loss. The principle logic of the reason for the achievement of reduction in the optical propagation loss by applying such a taper structure is well-known in the technical field of the optics, and further description is omitted here.

Figure 7A:
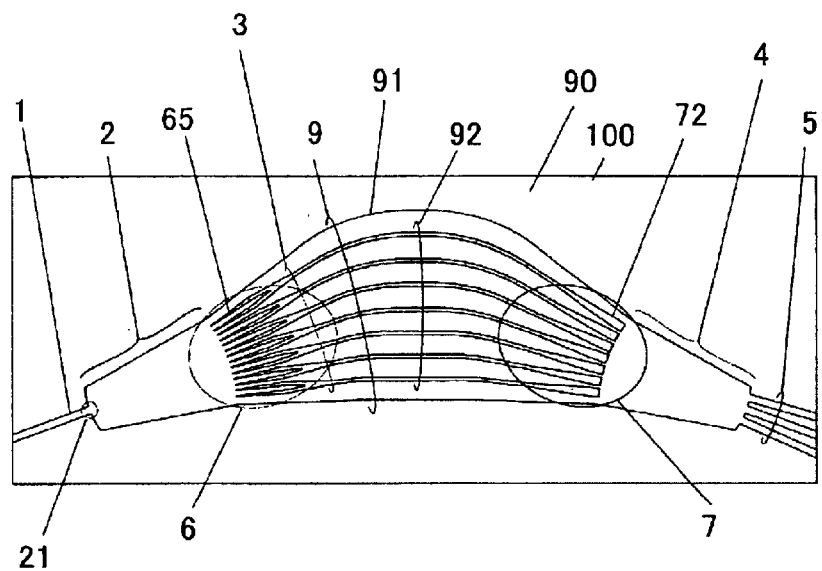
FIG. 7A shows a plan view of an AWG according to a second embodiment of the present invention.
Figure 7B:
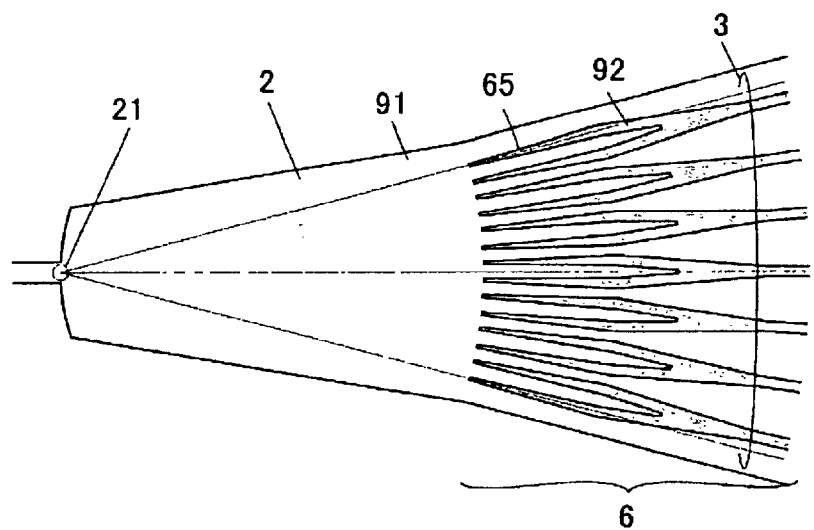
FIG. 7B shows a partial magnified view thereof in particular at a portion at which an input slab waveguide and a channel waveguide are connected with one another.

FIGS. 7A and 7B show a further variant embodiment of the first embodiment. As shown in the figures, it is also preferable to provide branch parts 65 at portions optically connecting the channel waveguide 3 with the input slab waveguide 2. In each branch part 65, as shown in FIG. 7B, each waveguide element (core) branches into a plurality of (in this example, two of) waveguide elements. Thus, by employing such a structure of branching waveguide element at the connection portion, it is possible to increase the number of light entrances, and, as a result, to expand the optical mode field with a reduced loss similarly as in the above-described embodiment shown in FIGS. 6A and 6B. Accordingly, similarly, the optical propagation loss can be effectively reduced. The reference numeral 21 denotes an incident light dispersion center.

Figure 8A:
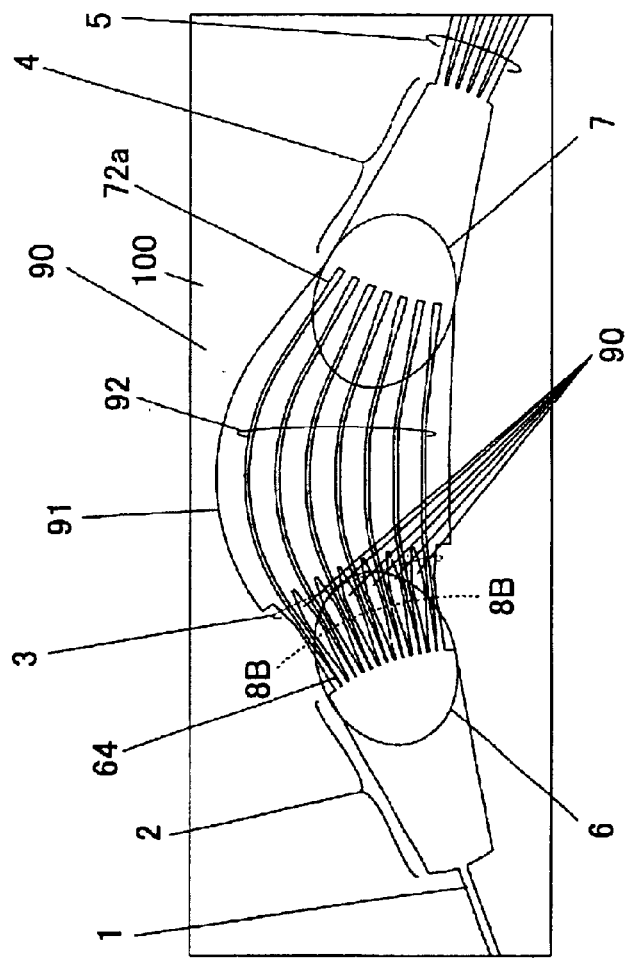
FIG. 8A shows a plan view of an AWG according to a third embodiment of the present invention.
Figure 8B:
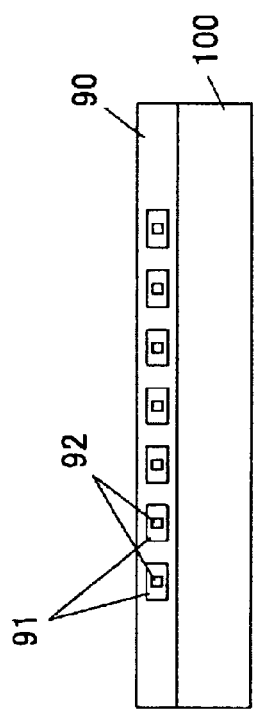
FIG. 8B shows a cross-sectional view thereof taken along a line 8B—8B.

FIGS. 8A and 8B show a further variant embodiment of the embodiment of FIGS. 5A and 5B. As shown in FIG. 8A showing a cross-sectional view of optical paths in the channel waveguide 3, for each optical path, a high-refractive-index material is used as a central part (inner core) 92, an medium-refractive-index material is used as an intermediate part (outer core) 91 enclosing the central part, and further, a low-refractive-index material is used as a base part (clad) 90 further enclosing the above-mentioned intermediate part 92. Thus, by employing such a formation in that a higher-refractive-index part is enclosed by a lower-refractive-index part in sequence, it is possible to improve an effect of preventing light from leaking from each waveguide element or core element. Thereby, it becomes possible to effectively prevent such a problematic phenomenon as that of leakage of light to an adjacent waveguide element at a portion of sharply bending of cores. Accordingly, efficient optical propagation without cross-talk problem can be achieved.

Figure 1:
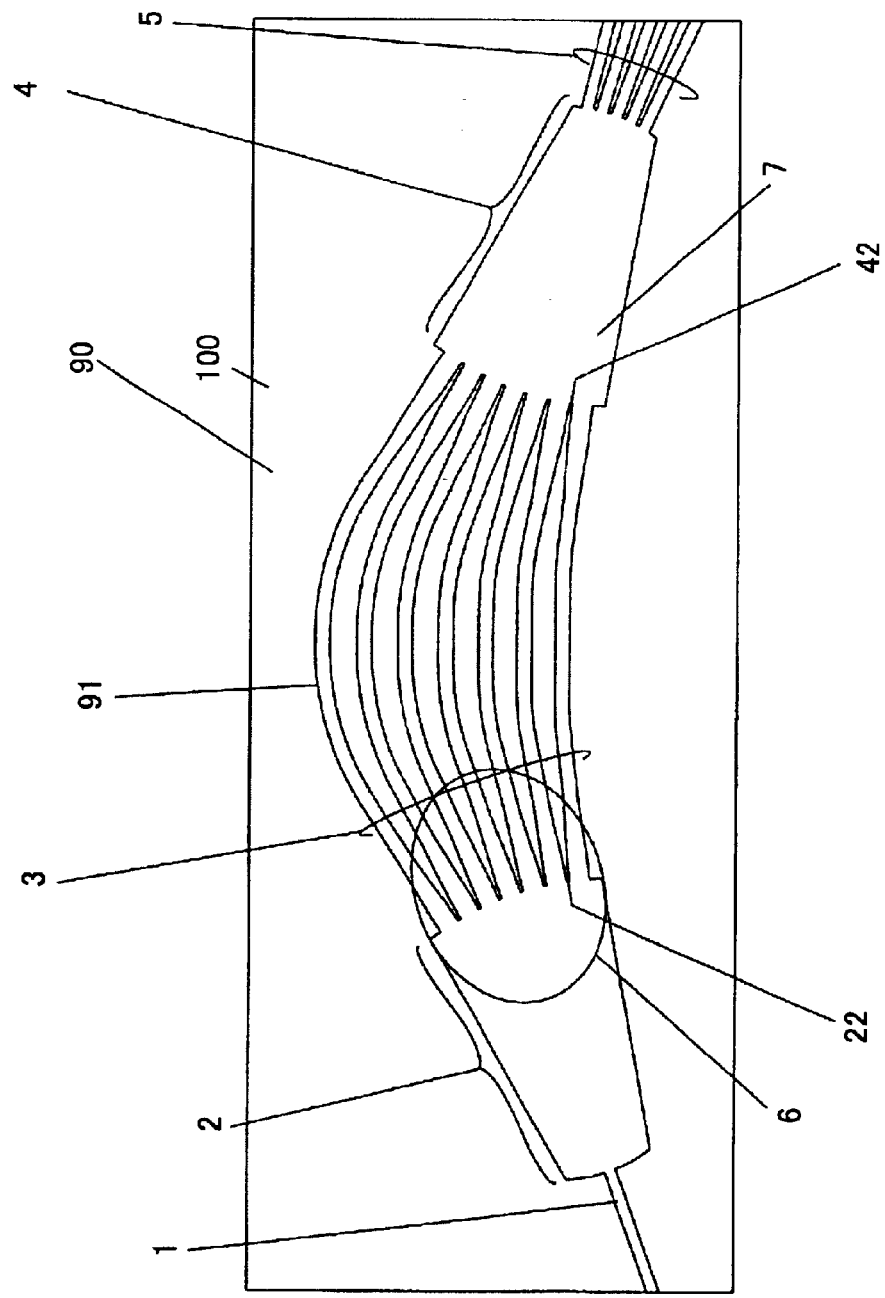
FIG. 1 shows a plan view of general configuration of a medium-refractive-index type AWG in the related art (first related art)

In the AWG according to the above-described first through third related arts, mode mismatch loss may occur at the connection portion (slab boundary 22 or 42 in FIGS. 1 through 3) at which the light having its light path widen in the input slab waveguide 2 is incident on the plurality of waveguide elements of the channel waveguide 3.

In contrast thereto, according to the present invention, a part (corresponding to the mode transformation part 11 or 55 in the example of FIG. 3) at which mode mismatch would otherwise occur between waveguides having different Δn, i.e., between the medium-refractive-index waveguide and high-refractive-index waveguide, is disposed at the position (corresponding to the connection ends 61 or 71 in the embodiment of FIG. 5A), i.e., the connection portion between the slab waveguide and channel waveguide, i.e., a part of expanding the mode field. Thereby, the two types of mode mismatch, i.e., mismatch due to change in Δn and mismatch due to connection between the slab waveguide and channel waveguide can be made to occur at the same position. Accordingly, it becomes possible to reduce the total mode mismatch loss to the half. Thus, as the relevant two portions exist in one AWG, i.e., on the input side (6) and output side (7), it is possible to reduce the total four mode mismatch occurring places into two. Accordingly, it is possible to effectively reduce the total mode mismatch loss.

Figure 4A:
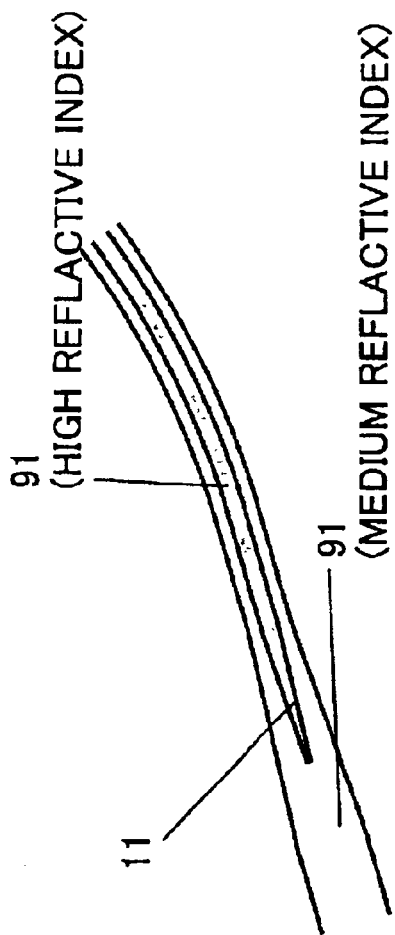
FIGS. 4A and 4B show details at mode transformation parts of the AWG shown in FIG. 3.
Figure 4B:
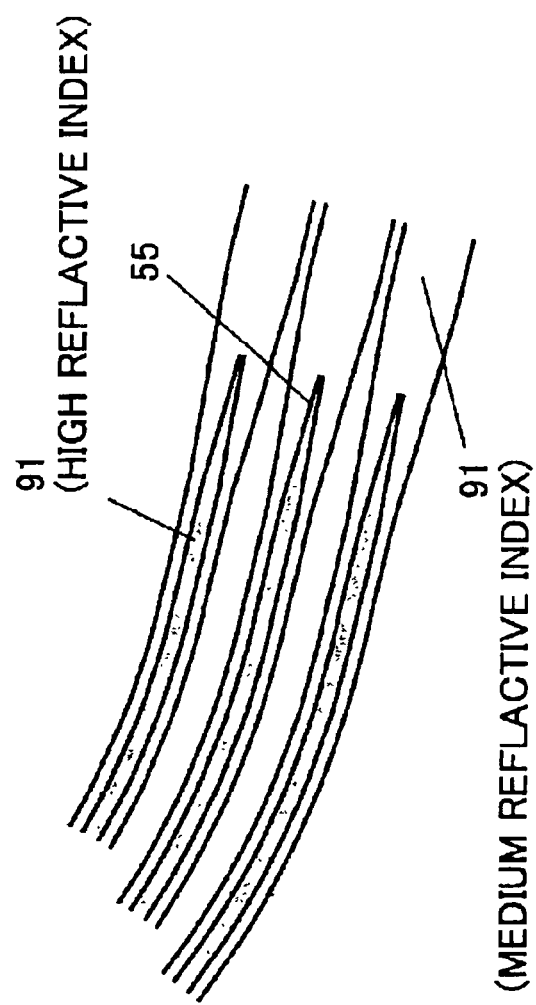

Furthermore, according to the present invention, the alignment accuracy requirement in the optical device manufacture, in particular, on photograph mask alignment between the pattern of Δn=0.5% (for the medium-refractive-index part) and the pattern of Δn=1.5% pattern (for the high-refractive-index part) can be eased. Namely, for the alignment accuracy between the waveguides each having the core width of several micrometers (in the example shown in FIGS. 4A and 4B), the mask alignment accuracy as low as less than 1 micrometer is required. However, according to the present invention, the mode transformation between the slab waveguide and channel waveguide, performed at the connection part 6 or 7 in the example shown in FIG. 5A, is thus performed at a position at which the light path or core width has been already widened through the input slab waveguide 2, or before being shrunken yet through the output slab waveguide 5. Accordingly, the light, the optical path of which has been already widened or is not yet shrunken, is coupled with the respective plurality of waveguide elements of the channel waveguide having the higher refractive index. Thus, the required mask alignment accuracy should be at most on the order of 10 micrometers there. Accordingly, it is possible to remarkably ease the photomask alignment accuracy requirement in the manufacture stage. Therefore, as superfluous loss due to mask alignment error thus should not occur, it is possible to realize positive reduction of AWG loss.

Each of the above-mentioned embodiments of the present invention will now be described again in detail.

FIG. 5A shows a plan view of the first embodiment of the present invention, while FIG. 5B shows a cross-sectional view thereof taken along the line 5B—5B.

On the input side, the AWG according to the first embodiment has the input waveguide 1, the slab waveguide 2 distributing given light, and the channel waveguide 3 having the plurality of waveguide elements or core elements arranged in a shape of an array. The material of the high refractive index is used only in the channel waveguide 3 (particularly, respective cores 92). On the output side, the slab waveguide 4 condenses the separate light elements propagating the cores 92 of the channel waveguide 5, and, thus, are output via the output waveguide 5. Glass (SiO2) material can be used as these waveguide elements 92.

The manufacture method thereof will now be described. The under clad (low refractive-index part or the base) 90 of the low refractive index, the input-and-output waveguides 1 and 5 and the input and output slab waveguides 2 and 4, both of the medium refractive index, and the core part 92 forming the channel waveguide 3 of the high refractive index are formed on the silicon substrate 100 through a combination of a glass deposition process in a CVD method or an FHD method and a photo lithography process. The specific refractive index Δn between the medium refractive index and the low refractive index is approximately 0.5%. The specific refractive index Δn between the high refractive index and the low refractive index is approximately 0.8%, 1.5%, or so. The low refractive index 'n' is, for example, 1.455.

According to the first embodiment, at the fiber connection point, i.e., the input end of the input waveguide 1 and output end of the output waveguide 5, the waveguides (1, 2, 4 and 5) of the low refractive index are used. As a result, the fiber connection loss is as low as 0.1 dB at the connection between single-mode optical fibers and waveguides 1, 2, 4 and 5, respectively. Furthermore, as the mode transformation is performed at the connection point between the channel waveguide 3 and slab waveguide 2 or 4. Thus, the respective losses caused by the two types of mode mismatch, i.e., mode transformation between the medium-refractiveindex waveguide and high-refractive-index waveguide; and mode transformation between the channel waveguide and slab waveguide, are made to occur at the same place (connection end 61 or 71). As a result, the total loss of the AWG can be reduced by 1 dB.

FIGS. 6A and 6B show the plane views of the respective variant embodiments of the above-described first embodiment of the present invention. In these variant embodiments, as mentioned above, the taper parts 62/63 and 72 are provided between the channel waveguide 3 and the respective slab waveguides 2 and 4, where the width of each channel waveguide element (high-refractive-index core 92) increases (on the input and output sides of the example shown in FIG. 6A and on the output side of the example shown in FIG. 6B) or decreases (on the input side of the example shown in FIG. 6B) gradually. Through these taper parts, the channel waveguide 3 and slab waveguides 2 and 4 are optically connected, respectively.

FIGS. 9A, 9B and 9C illustrate the details of the first variant embodiment shown in FIG. 6B. FIG. 9A shows a partial plan view of the AWG shown in FIG. 6A, FIG. 9B shows a cross-sectional view thereof taken along the line 9B—9B, and FIG. 9C shows a cross-sectional view thereof taken along the line 9C—9C. FIGS. 9B and 9C correspond to FIG. 5B, and the duplicated description is omitted. Although the width of each channel waveguide element or the high-refractive-index core 92 gradually decreases toward the slab waveguide 2 in this case, since the optical mode field width can be expanded also by this configuration, it becomes possible to reduce effectively the connection loss between the slab waveguide and the channel waveguide as a result.

Next, the configuration of the above-mentioned second embodiment of the present invention will be described in detail. Since the second embodiment is basically same as the first embodiment, duplicated description is omitted.

FIG. 7A shows the plan view of the second embodiment while FIG. 7B shows the partial magnified view thereof at the input connection part 6 shown in FIG. 7A.

In this example, as mentioned above, at the connection part between the channel waveguide 3 and slab waveguide 2, as shown in the figures, each channel waveguide element of high-refractive-index core 92 braches into the plurality of (two of, in this example) wavelength elements, so as to form the branch connection ends 65, by which the input slab waveguide 2 and the channel waveguide 3 are optically connected.

By applying such a configuration, it becomes possible to effectively widen the light entrance when the light is incident on the channel waveguide 3 from the slab waveguide 2. As a result, the light having propagated through the slab waveguide 2 can be effectively led into the channel waveguide 3. Accordingly, the propagation loss can be effectively reduced at a time of the light incidence.

Next, the configuration of the above-mentioned third embodiment of the present invention will now be described in detail. Since the third embodiment is also basically the same as the above-described first embodiment, duplicated description is omitted.

FIG. 8A shows the plan view of the third embodiment while FIG. 8B shows the cross-sectional view thereof taken along the line 8B—8B. FIG. 8B corresponds to FIG. 5B.

In this embodiment, as shown in the figures, near the connection part between the slab waveguide 2 and the channel waveguide 3, for each waveguide element or core element, the medium-refractive-index part 91 (outer core) encloses the high-refractive-index part 92 (inner core), and further, the low-refractive-index part 90 (under clad or base) encloses the medium-refractive-index part 91. Different from the example shown in FIG. 5B, the medium-refractive-index parts 91 are provided in a separate manner specially for the respective waveguide elements or core elements near the input connection part.

According to the third embodiment, it becomes possible to effectively improve the effect of separately enclosing the respective optical signals into the particular channel waveguide elements. Thereby, it becomes possible to reduce the influence of radiation occurring at the time of mode transformation made at the connection part 6. Consequently, the optical propagation loss can be effectively reduced.

Next, the configuration of a fourth embodiment of the present invention will be described. Since the fourth embodiment has also basically the same configuration as that of the above-described first embodiment, duplicated description is omitted.

FIG. 10A shows a plan view of an AWG according to the fourth embodiment, FIG. 10B shows a partial magnified view thereof particularly for one waveguide element of the input connection part 6, and FIG. 10C shows a partial magnified view thereof particularly for one waveguide element of the output connection part 7.

In the fourth embodiment, as shown in the figures, throughout the full length of the channel waveguide 3, for each waveguide element, the medium-refractive-index part 91 (outer core) encloses the high-refractive-index part 92 (inner core), and further, the low-refractive-index part 90 (under clad or base) encloses the medium-refractive-index part 91. Similarly to the example shown in FIG. 8B, the medium-refractive-index parts 91 are provided in a separate manner specially for the respective waveguide elements but throughout the full length of the channel waveguide 3.

According to the fourth embodiment, in addition to the advantage obtained by the above-described third embodiment, throughout the full length of the channel waveguide 3, it becomes possible to effectively improve the effect of separately enclosing the respective optical signals into the particular channel waveguide elements, respectively. Thereby, it becomes possible to reduce not only the influence of radiation occurring at a time of the mode transformation, but also the amount of radiation and cross leakage to adjacent waveguide elements of the light at a time of the channel waveguide elements being bent sharply. Consequently, the optical propagation loss can be effectively reduced. Accordingly, not only the influence of radiation occurring in the mode transformation, but also radiation loss, adjacent waveguide element coupling loss and so forth occurring in the bending of cores can be effectively reduced. As a result, the propagation loss reduction and cross-talk reduction can be archived at the same time effectively.

Moreover, in the third and fourth embodiments described above, the configuration of the taper parts (64, 72a, 94i, 92i) corresponding to those described for the above-described second embodiment are also employed. Accordingly, in each embodiment, as in the second embodiment, the optical propagation loss can be reduced further effectively.

FIGS. 11A, 11B and 11C illustrate a variant embodiment of the above-mentioned fourth embodiment of the present invention. FIG. 11A shows a plan view of an AWG according to the variant embodiment of the fourth embodiment, FIG. 11B shows a partial magnified view thereof particularly for one waveguide element of the input connection part 6, and FIG. 11C shows a partial magnified view of the same particularly for one waveguide element but of the output connection part 7.

According to the variant embodiment of the fourth embodiment, different from the fourth embodiment, as shown in FIG. 11C, each taper inner core 92i in the output connection part 7 does not increase but decreases gradually in its width toward the output slab waveguide 5. Also by this configuration, same as in the width gradually increasing configuration, the optical signal can be exchanged efficiently toward the slab waveguide 5.

In FIGS. 10B, 10C, 11B and 11C, the reference numerals 22 and 42 denote slab boundaries at which the channel waveguide and slab waveguide are optically connected. The reference numeral 9a denotes a composite core having the configuration of combination of the high-refractive-index inner core 92 and medium-refractive-index outer core 91. The reference numerals 92i/94i denote the taper inner cores having the widths thereof gradually increased/decreased as mentioned above.

Furthermore, embodiments of the present invention is not limited to those described above, and various modifications may be made thereto. For example, change in the manner of combination of width gradually increasing configuration and the width gradually decreasing configuration at the taper parts may be made; a combination of the taper parts and branch parts (see FIG. 7B) may be applied in a various way; the configuration (enclosing configuration) of enclosing each inner core by the lower-refractive-index part in sequence may be further combined therewith; the portion to which the above-mentioned enclosing configuration is applied may be further changed, and so forth.

Thus, the present invention is not limited to the above-described embodiments, and variations and modifications may be made without departing from the scope of the present invention.

The present application is based on Japanese priority application No. 2001-138741, filed on Nov. 14, 2001, the entire contents of which are hereby incorporated by reference.

What is claimed is:

1. A waveguide optical device, comprising:
   a channel core pattern comprising a plurality of core pattern elements having different lengths;
   another core pattern connected with said channel core pattern in series,
   wherein a refractive index of said channel core pattern is higher than a refractive index of said another core portion; and
   an enclosing part to enclose said channel core pattern and having a refractive index approximately equal to the refractive index of said another core pattern.

2. The waveguide optical device as claimed in claim 1, wherein both said channel core pattern and said another other core pattern are enclosed by a common clad having a refractive index lower than the refractive indexes of said channel core pattern and said another core pattern.

3. The waveguide optical device as claimed in claim 2, wherein:
   said channel core pattern is enclosed by an outer core pattern which is further enclosed by said common clad; and
   said outer core pattern and said another core pattern have the same refractive index.

4. A waveguide optical device, comprising:
   a channel core pattern comprising a plurality of core pattern elements having different lengths; and
   another core pattern connected with said channel core pattern in series,
   wherein a specific refractive index of said channel core pattern with respect to a clad thereof is higher than a specific refractive index of said another core pattern with respect to a clad thereof; and
   an enclosing part to enclose said channel core pattern and having a refractive index approximately equal to the refractive index of said another core pattern.

5. The waveguide optical device claimed in claim 4, wherein said clad of said channel core pattern and said clad of said another core pattern comprise a common clad having the same refractive index.

6. The waveguide optical device as claimed in claim 5, wherein:
   said channel core pattern is enclosed by an outer core pattern which is further enclosed by said common clad; and
   said outer core pattern and said another core pattern have the same refractive index.

7. The waveguide optical device as claimed in claim 1, wherein:
   said channel core pattern comprises a taper part at a portion thereof at which said channel core pattern is connected with said another core pattern, in which the taper part of each core pattern element increases or decreases in its width.

8. The waveguide optical device as claimed in claim 4, wherein:
   said channel core pattern comprises a taper part at a portion thereof at which said channel core pattern is connected with said another core pattern, in which the taper part of each core pattern element increases or decreases in its width.

9. The waveguide optical device as claimed in claim 1, wherein:
   said channel core pattern comprises a branch part at a portion thereof at which said channel core pattern is connected with said another core pattern, in which the branch part of each core pattern element branches.

10. The waveguide optical device as claimed in claim 4, wherein:
    said channel core pattern comprises a branch part at a portion thereof at which said channel core pattern is connected with said another core pattern, in which the branch part of each core pattern element branches.

11. The waveguide optical device as claimed in claim 1, wherein:
    each core pattern element of said channel core pattern has a configuration such that a central part is enclosed by a first enclosing part having a refractive index lower than that of said central part, and further, said first enclosing part is enclosed by a second enclosing part having a refractive index lower than that of said first enclosing part.

12. The waveguide optical device as claimed in claim 4, wherein:
    each core pattern element of said channel core pattern has a configuration such that a central part is enclosed by a first enclosing part having a refractive index lower than that of said central part, and further, said first enclosing part is enclosed by a second enclosing part having a refractive index lower than that of said first enclosing part.

13. A waveguide optical device for combining a plurality of optical signals having different wavelengths or demultiplexing a multiplexed optical signal, comprising:

a base part having a predetermined refractive index;

an input waveguide having a refractive index higher than that of said base part, and comprising a core connected with a core of an optical fiber;

an input slab waveguide comprising a core connected with said input waveguide having a refractive index approximately equal to that of said input waveguide, wherein the core width is wider than that of said input waveguide;

a channel waveguide having a refractive index higher than that of said input slab waveguide, comprising a plurality of cores having different lengths and connected with said input slab waveguide, and enclosed by an enclosing part having a refractive index approximately equal to that of said input waveguide;

an output slab waveguide having a core connected with the respective cores of said channel waveguide, and having a refractive index approximately equal to that of said enclosing part of said channel waveguide; and an output waveguide having a plurality of cores having a refractive index approximately equal to that of said output slab waveguide and connected with the core of said output slab waveguide, wherein each core of said plurality of cores has a width narrower than that of said output slab waveguide.

14. The waveguide optical device claimed in claim 13, wherein:

said channel waveguide has a taper part at, at least one of portions thereof at which said channel waveguide is connected with said input slab waveguide and output slab waveguide, in which the taper of part each core width gradually increases or decreases toward the respective one of said input slab waveguide and output slab waveguide.

15. The waveguide optical device claimed in claim 13, wherein:

said channel waveguide has a branch part at, at least one of portions thereof at which said channel waveguide is connected with said input slab waveguide and output slab waveguide, in which the branch part of each core branches toward the respective one of said input slab waveguide and output slab waveguide.

16. The waveguide optical device as claimed in claim 13, wherein:

said channel waveguide is configured so that at least one of portions thereof at which said channel waveguide is connected with said input slab waveguide and output slab waveguide has a configuration such that each core is enclosed by a first enclosing part having a refractive index lower than that of said core, and further, said first enclosing part is enclosed by a second enclosing part having a refractive index lower than that of said first enclosing part.

17. The waveguide optical device as claimed in claim 13, wherein:

said channel waveguide is configured so that, throughout the full length thereof, each core is enclosed by a first enclosing part having a refractive index lower than that of said core, and further, said first enclosing part is enclosed by a second enclosing part having a refractive index lower than that of said first enclosing part.

18. A waveguide optical device, comprising:

a first core pattern comprising a plurality of elements;

a second core pattern connected with said first core pattern and having a refractive index; and an encloser to enclose said first core pattern and having a refractive index approximately equal to the refractive index of said second core pattern.

19. A waveguide optical device to combine a plurality of optical signals having different wavelengths or demultiplexing a multiplexed optical signal, comprising:

a base having a refractive index;

an input waveguide supported by the base and having a refractive index higher than the refractive index of the base;

an input slab waveguide connected with the input waveguide;

a channel waveguide connected to the input slab waveguide and having a refractive index higher than the refractive index of the input waveguide;

an encloser to enclose the channel waveguide, having a refractive index approximately equal to the refractive index of the input waveguide;

an output slab waveguide connected the channel waveguide, and having a refractive index approximately equal to the refractive index of the encloser; and an output waveguide connected to the output slab waveguide and having a refractive index approximately equal to the refractive index of the output slab waveguide.

20. The waveguide optical device of claim 19, wherein the input waveguide comprises a core, the input slab waveguide comprises a core having a width greater than a width of the core of the input waveguide, the output slab waveguide comprises a core, and the output waveguide comprises a plurality of cores each having a width narrower than the width of the core of the output slab waveguide.

* * * * *